US011548640B2

(12) United States Patent
Dowty (10) Patent No.: US 11,548,640 B2
(45) Date of Patent: Jan. 10, 2023

(54) COMPARTMENT CONTENT NOTIFICATION AND INSPECTION DEVICE AND METHOD

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 511 days.

(21) Appl. No.: 16/688,548

(22) Filed: Nov. 19, 2019

(65) Prior Publication Data

US 2021/0147085 A1 May 20, 2021

(51) Int. Cl.
*B64D 11/06* (2006.01)
*H04W 4/029* (2018.01)
*B64D 45/00* (2006.01)
*G01S 13/88* (2006.01)

(52) U.S. Cl.
CPC .......... *B64D 11/0636* (2014.12); *B64D 45/00* (2013.01); *G01S 13/88* (2013.01); *H04W 4/029* (2018.02); *B64D 2045/007* (2013.01)

(58) Field of Classification Search
CPC ................ B64D 11/0636; B64D 45/00; B64D 2045/007; G01S 13/88; H04W 4/029
See application file for complete search history.

(56) References Cited

U.S. PATENT DOCUMENTS

| 8,885,242 | B2 | 11/2014 | Guarr et al. |
| 10,301,028 | B2 | 5/2019 | Stephens et al. |
| 10,669,028 | B1* | 6/2020 | Kuyper .................. G08B 21/24 |
| 2018/0202792 | A1* | 7/2018 | Hamabe .................. G01V 3/38 |

FOREIGN PATENT DOCUMENTS

| CA | 3032317 A1 | 5/2018 | |
| DE | 19645503 | * 5/1997 | ............. B60R 21/06 |
| WO | 2017176811 A1 | 10/2017 | |

* cited by examiner

*Primary Examiner* — Hongmin Fan
(74) *Attorney, Agent, or Firm* — Suiter Swantz pc llo (57) ABSTRACT

A system and method for vehicle compartment item presence indication senses an item within a vehicle compartment and notifies a user if the item is expected or unexpected within the compartment based on a vehicle state. Should the item be expected in a compartment during a phase of flight where the compartment is expected to contain items, there is no abnormal indication. However, if a compartment is expected to be empty during a specific phase of flight and the sensors indicate an item is present, the system will alert the user to the unexpected item.

14 Claims, 7 Drawing Sheets

COMPARTMENT CONTENT NOTIFICATION AND INSPECTION DEVICE AND METHOD

BACKGROUND

Passenger vehicle (including aircraft, train, bus, ship, etc.) operators may receive complaints from passengers when they inadvertently leave items onboard an aircraft. An item left within an overhead bin may be difficult to recall after a long journey or late at night. A crewmember may be tasked with opening each compartment door within a galley to inventory galley contents. A cleaner may be tasked with opening each compartment door within a lavatory for lavatory inventory.

Similarly, in certain countries, crewmembers and maintenance personal may be required to perform maintenance and or security inspections of closed compartments before each operation. This process requires critical down time. Additionally, latched compartments incur a significantly larger frequency of cycles due to the inspections resulting in premature latch and door failure.

Therefore, a need remains for a system and related method which may overcome these limitations and provide a novel solution to determining if an item is within a compartment.

SUMMARY

In one aspect, embodiments of the inventive concepts disclosed herein are directed to a system for vehicle compartment item presence indication. The system may comprise a compartment onboard a vehicle, the compartment including a compartment door and a sensor within the compartment, the sensor may be configured for wirelessly sensing a presence of an item within the compartment. The system may also include an indicator configured to perform an alert and a vehicle system bus configured for transmitting a vehicle state of the vehicle.

For control, the system may employ a controller operatively coupled with each of the sensor the indicator, and the vehicle system bus and a tangible, non-transitory memory configured to communicate with the controller, the tangible, non-transitory memory having instructions stored therein that, in response to execution by the controller, cause the controller to perform a plurality of tasks associated with the function of the system.

The controller may receive the vehicle state of the vehicle from the vehicle system bus and receive compartment information including an expected feature within the compartment, and receive, from the sensor, an indication of the item present within the compartment. The controller may determine if the indication is an abnormal based on the compartment information, the indication and the vehicle state. If abnormal, the controller may generate the alert and activate the indicator in response to generating the alert.

A further embodiment of the inventive concepts disclosed herein may include a method for vehicle compartment item presence indication. The method may include positioning a sensor within a compartment onboard a vehicle, the sensor configured for wirelessly sensing an item within the compartment. The method may further include receiving a vehicle state of the vehicle, receiving, from the sensor, an indication of the item present within the compartment, and determining if the indication is an abnormal based on the indication and the vehicle state. If abnormal, the method may include generating the alert and activating the indicator in response to generating the alert.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for vehicle compartment item presence indication senses an item within a vehicle compartment and notifies a user if the item is expected or unexpected within the compartment based on a vehicle state. Should the item be expected in a compartment during a phase of flight where the compartment is expected to contain items, there is no abnormal indication. However, if a compartment is expected to be empty during a specific phase of flight and the sensors indicate an item is present, the system will alert the user to the unexpected item.

REFERENCE CHART

| | |
|---|---|
| 100 | System |
| 110 | Controller |
| 112 | User Interface |
| 114 | Vehicle System Bus |
| 116 | Memory |
| 118 | Vehicle State |
| 120 | Compartment |
| 122 | Compartment Door |
| 124 | Item |
| 126 | Compartment Illuminator |
| 130 | Sensor |
| 132 | Sensor Field |
| 152 | Network |
| 154 | Indicator Light |
| 156 | Interface |
| 158 | Switchable Opacity Material |
| 160 | Optional Alerts |

-continued

| | |
|---|---|
| 200 | Switchable Opacity View |
| 224 | Watch Item |
| 256 | Opaque State |
| 258 | Clear State |
| 300 | Logic Flow |
| 302 | Position Sensor in the Compartment |
| 304 | Receive Vehicle State Data |
| 306 | Receive Compartment Information |
| 308 | Receive Sensor Indication |
| 310 | Abnormal |
| 312 | Parked at Gate |
| 314 | Below 5000 Ft |
| 316 | User Enable |
| 318 | Generate the alert |
| 320 | Activate the indicator |
| 400 | Overhead Bin View |
| 500 | Lavatory View |
| 520 | Lavatory Storage Compartment |
| 524 | Expected Towels |
| 534 | Expected Tissue |
| 538 | Lavatory Door Clear |
| 548 | Towel Storage Clear |
| 554 | Unexpected Weapon |
| 558 | Storage Door Clear |
| 600 | External View |
| 622 | Baggage Hold Door |
| 658 | Baggage Hold Door Clear |
| 700 | Method Flow |
| 702 | Positioning a Sensor |
| 704 | Receiving Vehicle Sate Data |
| 706 | Receiving an Indication |
| 708 | Determining if Abnormal |
| 710 | Generating the Alert |
| 712 | Activating the Indicator |

Figure 1:
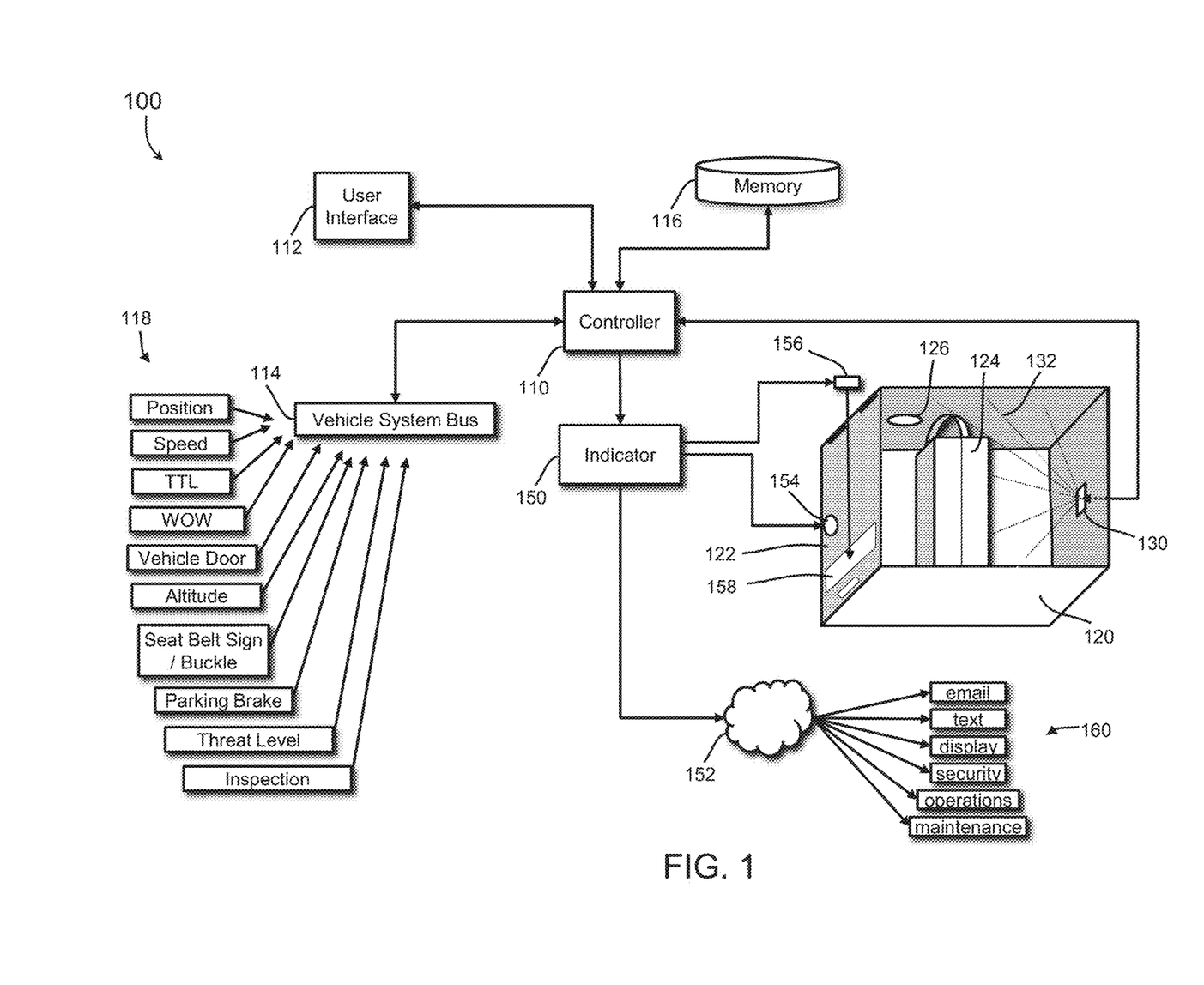
FIG. 1 is a diagram of a system for vehicle compartment item presence indication in accordance with an embodiment of the inventive concepts disclosed herein.

Referring to FIG. 1, a diagram of a system for vehicle compartment item presence indication in accordance with an embodiment of the inventive concepts disclosed herein is shown. Generally, the system for vehicle compartment item presence indication 100 may include a compartment 120 onboard a vehicle, the compartment 120 may be fitted with a compartment door 122 allowing access to the compartment 120. The compartment 120 may include a plurality of types of compartments 120 onboard the vehicle configured for stowage of an associated plurality of items. In embodiments, the compartment 120 may include an overhead bin, a passenger stowage, a closet, a lavatory compartment, a passenger cabin, a passenger cabin class, a galley compartment, a galley beverage cart, a maintenance compartment, a flight deck stowage, and a flight deck compartment.

As used herein, a vehicle may include any of a plurality of vehicles within which passengers and crew may be carried. Some exemplary vehicles may include an aircraft and aerial vehicle, a bus, an auto, a boat, and a train.

To sense an item within the compartment 120, the system for compartment item presence indication 100 may include one or more of a sensor 130 which may be positioned within the compartment 120. The sensor may be configured for wirelessly sensing a presence of an item 124 within the compartment 120. In one embodiment of the inventive concepts disclosed herein, the sensor may include an infrared (IR) transceiver, a radio frequency (RF) transceiver, and a laser transceiver. Also, the sensor may include a single sensor of a plurality of sensors including a transmitter paired with a distal receiver, a transmitter paired with a proximal receiver, and a plurality of transceivers positioned for a coverage of the compartment.

Compartment 120 sensor coverage may ensure the sensor 130 is functional to sense each portion of the compartment 120 ensuring there are no blind areas within the compartment 120 hidden from a sensor field 132. The sensor field 132 may be defined as a field of view of the sensor 130 having an angular field and a range. In one embodiment of the inventive concepts disclosed herein, the sensor range may be greater than a size of the compartment 120 in which the sensor 130 is positioned.

Further, different sensor types may be specifically applicable to different compartments. example, a compartment 120 requiring a detailed sensor field 132 to include sensing small items may benefit from a high definition laser sensor. While a compartment 120 where larger items may be anticipated may benefit from a less expensive RF transceiver to sense a larger or moving item.

The system for compartment item presence indication 100 may include an indicator 150 configured to perform an alert. The indicator 150 may be a conduit for a plurality of alert types to alert a user of the item present in the compartment 120. In one embodiment of the inventive concepts disclosed herein, the indicator 150 may include a light 154, a light proximal with the compartment door 122, a communication to a crew member or a passenger, and a wireless notification. In one embodiment of the inventive concepts disclosed herein, the indicator 150 may couple with a network 152 to send the alert further than locally onboard the vehicle. Here, one exemplary optional alert 160 may include an email to a passenger, a text message, a display, a security notification, an alert to an operations center, and an alert to a maintenance control.

In one embodiment of the inventive concepts disclosed herein, the indicator 150 may send the alert to an interface 156 coupled with a switchable opacity material 158 embedded within the compartment door 122. In some embodiments, a portion of the compartment door 122 may be constructed of the switchable opacity material 158 configured for an opaque state and a clear state. The switchable opacity material 158 may comprise a portion of the compartment door 122 as well as the entirety of the compartment door 122. Here, a portion of the compartment door 122 may be comprised of the switchable opacity material 158. The clear state of switchable opacity material 158 may apply a current to the switchable opacity material 158 enabling a view within the compartment 120.

The system for compartment item presence indication 100 may further include a vehicle system bus 114 configured for transmitting a vehicle state 118 of the vehicle. Here, the vehicle system bus 114 may function to track each system onboard the vehicle including the vehicle state 118. As used herein, the vehicle state 118 may include those environments or phases of operation in which the vehicle may operate (e.g., phase of flight, enroute, boarding, deboarding, parked, etc.).

For example, one vehicle state 118 may include an aircraft parked at a gate with the parking brake set and seat belt sign off. An additional example may include an auto parked with the key removed or a boat in a specific position (e.g., docked) at zero speed while relatively stationary. For the aircraft embodiment, one aircraft vehicle state may include a taxi, takeoff, and landing (TTL) phase of flight, a weight on wheels (WOW) (e.g., whether the aircraft is on the ground), a state of the main cabin door, and an altitude. In addition, the aircraft state 118 may further include an altitude above or below, a rate of climb or descent, a status of a seat belt sign, a status of a seat belt buckle, a status of a vehicle (main cabin) door, a maintenance inspection, a security inspection, and a threat level.

The system for compartment item presence indication 100 may include a controller 110 operatively coupled with each of the sensor, the indicator, and the vehicle system bus. Also, a tangible, non-transitory memory 116 may be configured to communicate with the controller 110, the tangible, non-transitory memory 116 having instructions stored therein that, in response to execution by the controller 110, may cause the controller 110 to perform a variety of tasks to perform function for the system for compartment item presence indication 100.

In one embodiment of the inventive concepts disclosed herein, the system for compartment item presence indication 100 may further include a user interface 112 configured for receiving a command from a user (e.g., crewmember, passenger) and directing the controller 110 to declare a specific one of the vehicle states. For example, should a crewmember desire to determine if a compartment 120 is empty, the crewmember may interface with the controller 110 via the user interface 112 and declare a vehicle state allowing activation of the indicator 150 coupled with the alert light 154 to indicate a presence of an item 124 within the compartment. The user interface 112 may also allow entry of a threat status from a crewmember enabling the controller 110 to set a specific vehicle state 118 allowing specific crewmember awareness of and visible access to specific compartments 120.

System Function

In function, the system for compartment item presence indication 100 may employ the controller 110 to receive the vehicle state 118 of the vehicle from the vehicle system bus 114. The controller 110 may receive compartment information including an expected feature within the compartment. Here, an expected feature may include those items within the compartment 120 that are present within the compartment under normal circumstances during a specific vehicle state 118. For example, one expected feature within one compartment 120 may include a fire extinguisher located within an overhead bin near a flight attendant station during all phases of flight and vehicle states 118. Conversely, an item 124 may be defined as an opposite of the expected feature. An item may be a temporarily stored within the compartment 120 during a specific vehicle state 118. For example, a passenger suitcase temporarily stored within an overhead bin compartment 120 during a specific vehicle state 118 (e.g., TTL, no WOW).

The controller 110 may receive, from the sensor 130, an indication of the item 124 present within the compartment 120. Here, the item 124 may be the passenger suitcase within the overhead bin compartment 120. The controller 110 may determine if the indication is an abnormal based on the compartment information, the indication, and the vehicle state 118.

In one embodiment of the inventive concepts disclosed herein, an exemplary abnormal may be, in a comparison with the vehicle state 118, the item present in an expected empty compartment 120, an absence of the expected feature, a sensed person present in an expected empty portion of the compartment 120, and the item present in an expected empty portion of the compartment 120. The chart below may detail some examples of abnormal items in specific compartments 120.

Exemplary Abnormal Chart

| Vehicle State | Compartment | Item | Abnormal? |
|---|---|---|---|
| Parking brake Set, Main cabin door open | Overhead Bin | Any | Yes |

-continued

| Vehicle State | Compartment | Item | Abnormal? |
|---|---|---|---|
| TTL | Overhead Bin | Any | No |
| Below 10,000 ft | Lavatory | Any | Yes |
| Threat Level 4 | Forward Galley | Any | Yes |
| Stationary, engine off | Auto Trunk | Any | Yes |
| In motion, engine on | Auto Trunk | Any | No |
| TTL | Lavatory Storage | Any unexpected item | Yes |
| Above 5000 ft | Lavatory Storage | Expected feature | No |
| Parking brake Set, Main cabin door open | Forward Baggage Hold | Any | Yes |

In one embodiment of the inventive concepts disclosed herein, the controller 110 may generate the alert if the indication is abnormal and activate the indicator 150 in response to generating the alert. In this example, the indicator 150 may provide power to the alert light 154 to illuminate the alert light 154 and indicate to a user the presence of the item 124 within the compartment 120.

In an additional embodiment of the inventive concepts disclosed herein, to conserve electrical power, the controller 110 may remove power from the sensor 130 and the controller 110 during a specific vehicle state. For example, during cruise for extended periods, a stable situation may allow for the controller 110 to power down the system 100.

In one embodiment of the inventive concepts disclosed herein, as the controller may send the alert to the interface 156, the interface may apply a current to the switchable opacity material 158 altering the material from the opaque state to the clear state. In one embodiment of the inventive concepts disclosed herein, a portion of the compartment door 122 may be constructed of the switchable opacity material 158 wherein the controller 110 may activate the indicator and command the switchable opacity material 158 to the clear state.

In one embodiment of the inventive concepts disclosed herein, the system for compartment item presence indication 100 may include a compartment illuminator 126 configured to illuminate an internal area of the compartment 120. In embodiments, the compartment illuminator 128 may function to illuminate the compartment 120 during times when the alert may be active.

In one embodiment of the inventive concepts disclosed herein, the system 100 may provide a visualization to an area within the compartment for compartment inspection. However, each compartment 120 may possess a mechanical door 122 for a crewmember to manually open and inspect the compartment. In specific instances when a subsystem may fail, the system 100 may maintain the alternate mechanical option to open the door and inspect the compartment 120.

Figure 2A:
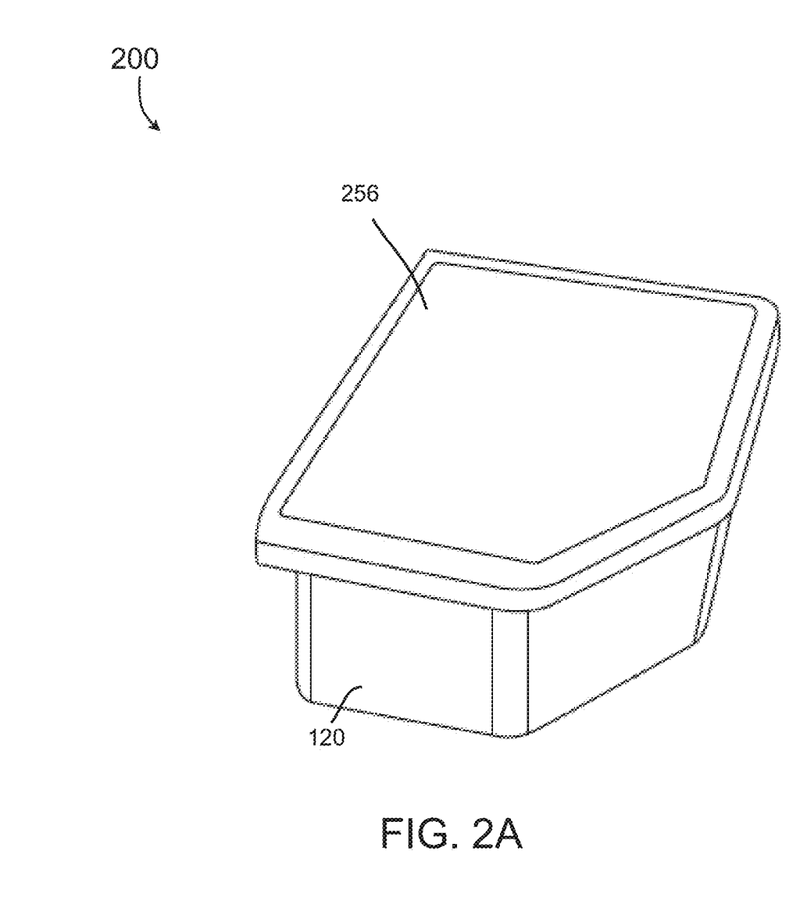
FIGS. 2A and 2B are a diagrams of a switchable opacity view in accordance with an embodiment of the inventive concepts disclosed herein.
Figure 2B:
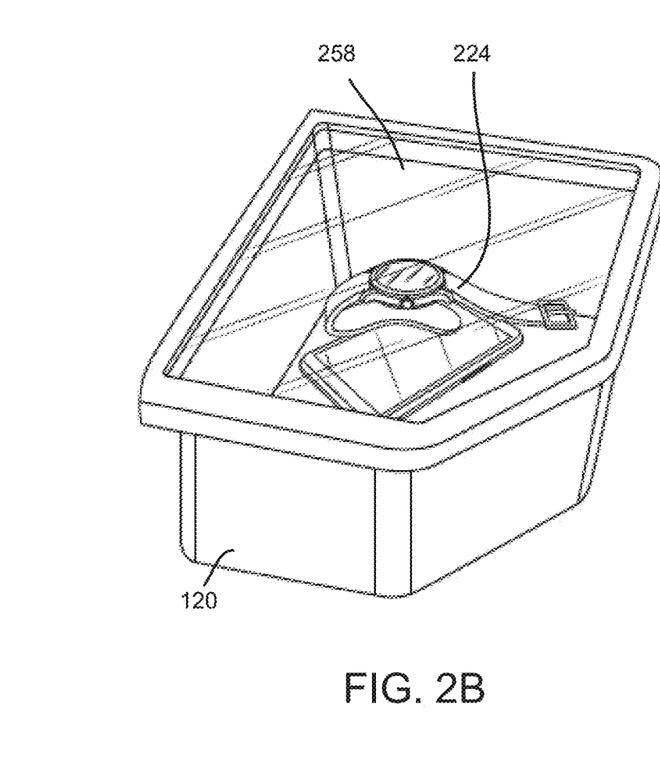

FIG. 2A-2B

Referring now to FIGS. 2A-B, a diagrams of a switchable opacity view in accordance with an embodiment of the inventive concepts disclosed herein is shown. A switchable opacity view 200 may indicate two exemplary states of the switchable opacity material 158 from the opaque state 256 to the clear state 258. A passenger may interact with the controller 110 via the user interface 112 and command one state or the other. For example, as a passenger may place a valuable item within the compartment 120, here a watch item 224, the passenger may command the controller 110 to alter the state of the switchable opacity material 158 to the opaque state 256 to ensure security of the stowed valuables.

Additionally, once the vehicle parks at the gate with the parking brake set and main cabin door open, the controller 110 may command the switchable opacity material 158 at each passenger seat to the clear state 258 to ensure passengers may remember stowed items. Also, the opacity may be coupled with the seat belt buckle of the passenger during a specific vehicle state 118. Here, the controller 110 may receive an indication of the state of the seat belt buckle with the main cabin door open and command the clear state 258 to ensure the passenger In another exemplary implementation of the inventive concepts disclosed herein, the compartment 120 may include a galley storage cart. The system for compartment item presence indication 100 incorporated within a galley cart may enable the flight attendant to inventory the contents within the galley cart compartment 120 without opening the galley cart door. For example, a side of the galley cart may be constructed of the switchable opacity material 158 enabling the crewmember to activate the switchable opacity material 158 via the user interface 112 and view the illuminated contents of the galley cart from an external vantage.

An additional implementation of the system for compartment item presence indication 100 may include a barrier between one or more seat classes within a passenger compartment. Here, a partial barrier between, for example, business class and coach class may include a partial barrier outside of an aisle area. During the aircraft state below 10,000 ft the controller 110 may command the switchable opacity material 158 within the partial barrier to the clear state 258 while above 10,000 ft the controller 110 may command the opaque state 256.

Figure 3:
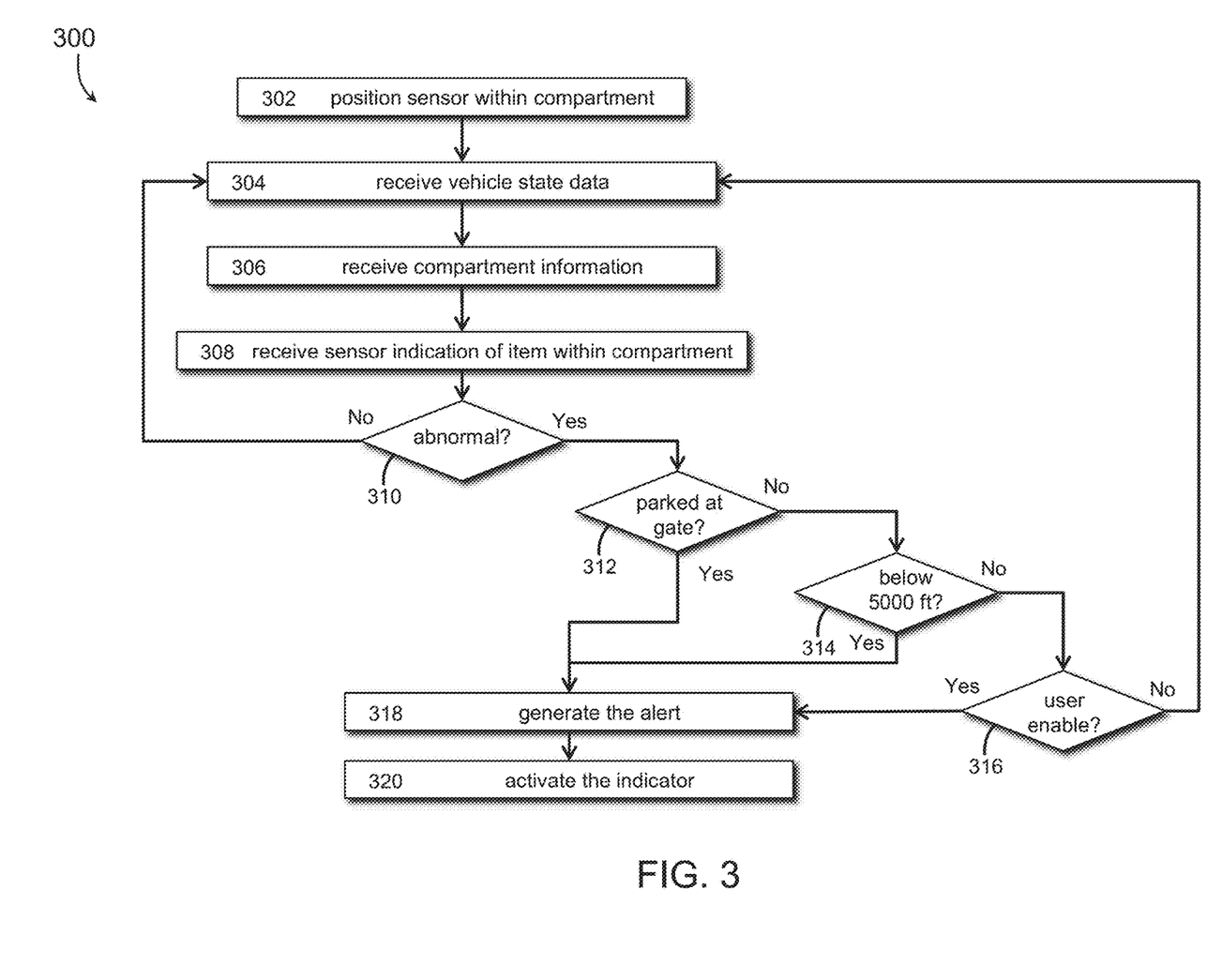
FIG. 3 is a diagram of an exemplary logic flow associated with an embodiment of the inventive concepts disclosed herein.

FIG. 3

Referring now to FIG. 3, a diagram of an exemplary logic flow associated with an embodiment of the inventive concepts disclosed herein is shown. One exemplary logic flow 300 may include, at a step 302, position a sensor within the compartment, and, at a step 304, receive vehicle state data. Additional received data may include compartment information at a step 306 and sensor indication at a step 308. A query 310 may function to determine if the item is abnormal, if no, the logic may return to the receiving data. However, if the result of query 310 is positive, the logic may pass to an additional query 312 of whether the aircraft is parked at gate, or whether the vehicle state data reveals the aircraft is below 5000 ft at query 314, or whether the user has commanded a user enable at a query 316 to manually enable the system. If either of the queries may be positive, the logic may pass to a step 318 to generate the alert and, at a step 320, to activate the indicator. However, should any of the queries result in a negative, the logic may return to the step 304 of receiving state data.

Figure 4:
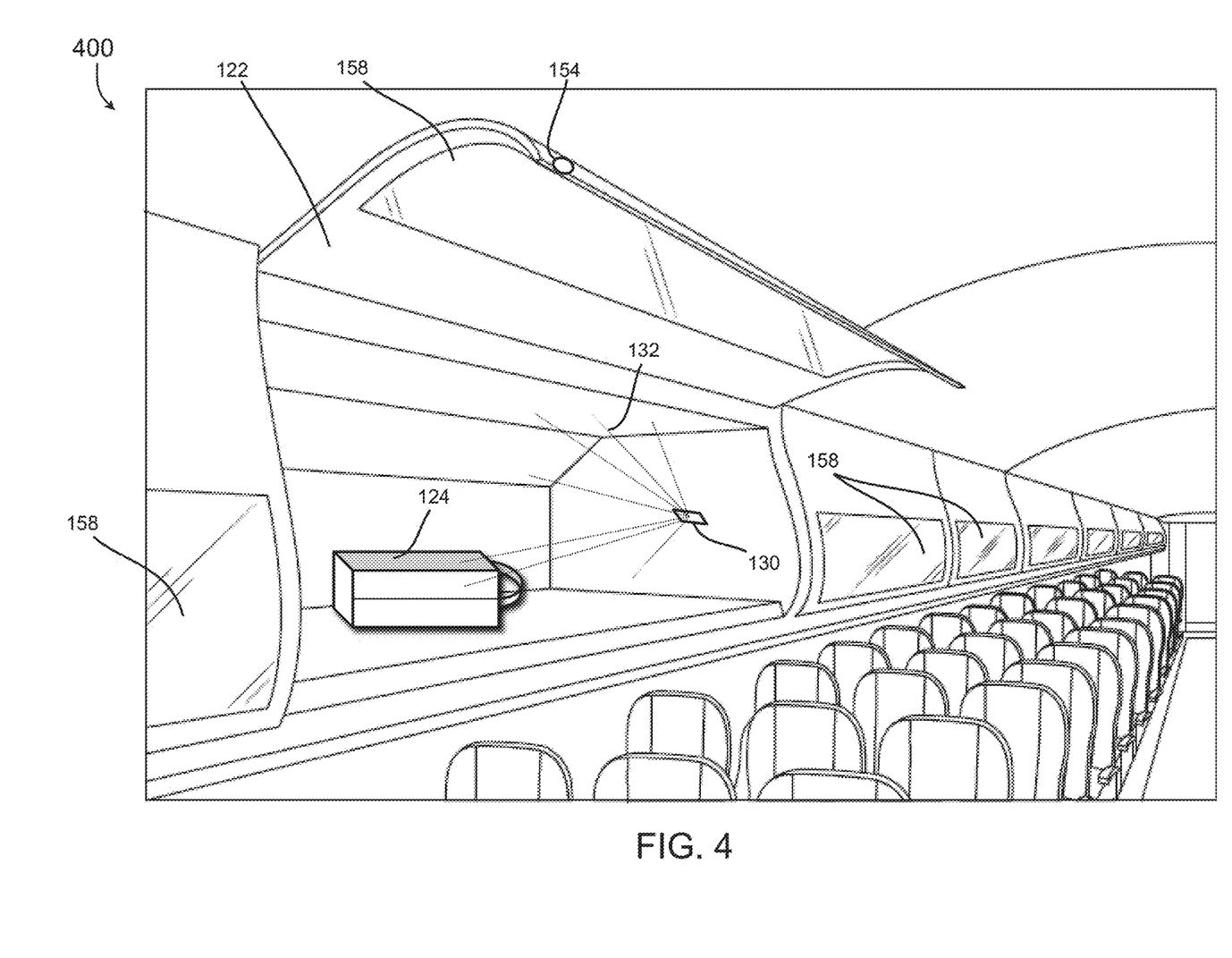
FIG. 4 is a diagram of an overhead bin compartment exemplary of one embodiment of the inventive concepts disclosed herein.

FIG. 4

Referring now to FIG. 4, a diagram of an overhead bin compartment exemplary of one embodiment of the inventive concepts disclosed herein is shown. An overhead bin view 400 may show the item 124 within the overhead bin sensed by the sensor 130. Also, a portion of each overhead bin compartment door 122 may be fitted with the switchable opacity material 158 able to function in the opaque state 256 or the clear state 258.

Figure 5:
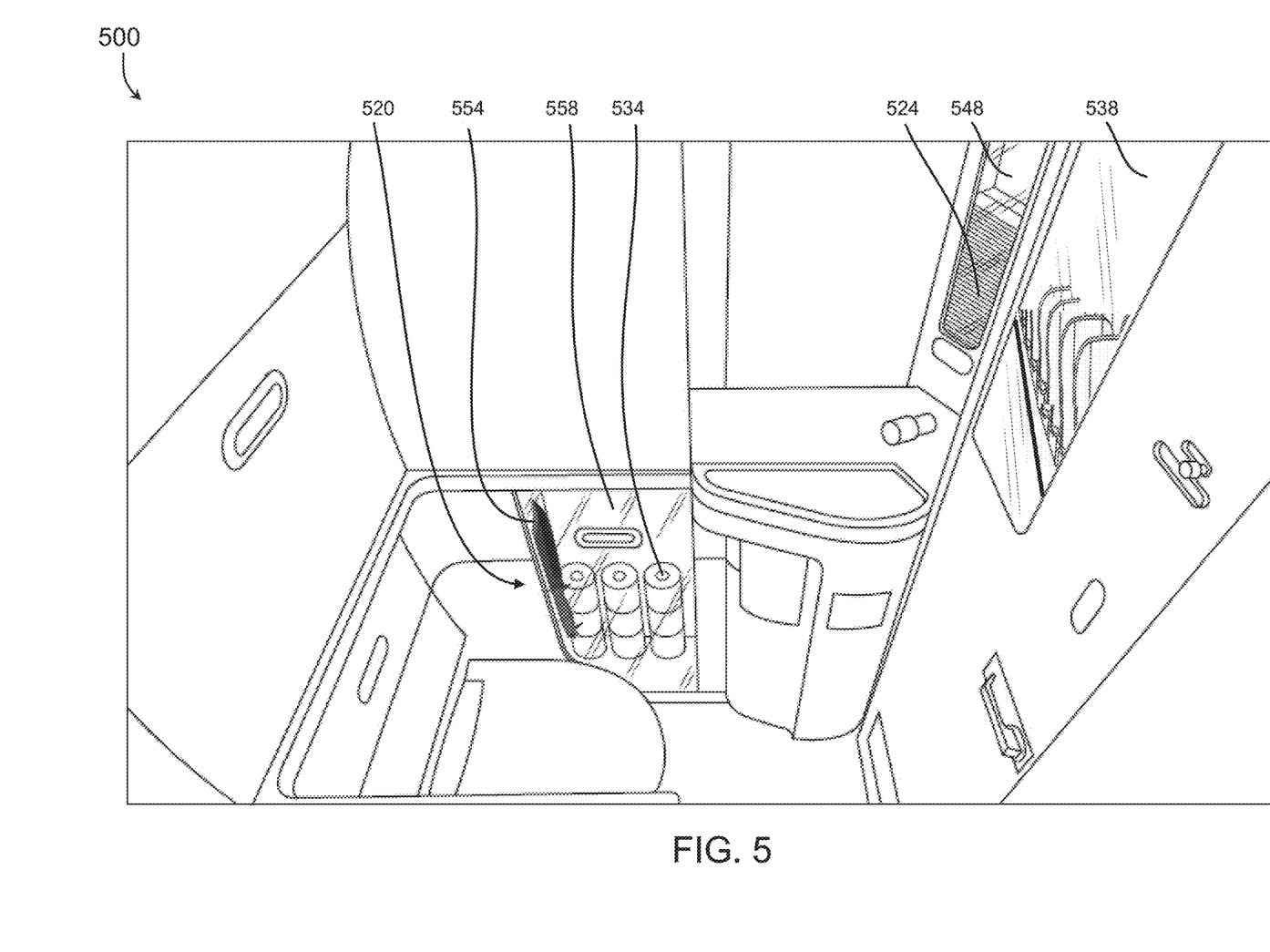
FIG. 5 is a diagram of a lavatory compartment in accordance with one embodiment of the inventive concepts disclosed herein.

FIG. 5

Referring now to FIG. 5, a diagram of a lavatory compartment in accordance with one embodiment of the inventive concepts disclosed herein is shown. A lavatory view 500 may indicate addition embodiments of the implementation of the system for compartment item presence indication 100. Here, a lavatory storage compartment 520 may be fitted with the switchable opacity material 158 enabling a view of the internal area of the compartment 520 through a storage door clear 558. Here, a tissue expected feature 534 may be sensed by the sensor in an expected area of the lavatory storage compartment 520. However, in an area of the compartment where no item is expected to be present, the sensor may detect an unexpected weapon 554 in a portion of the lavatory storage compartment 520 where no item should be present. The controller 110 may alert a crewmember should the sensor discover the unexpected weapon 554 as soon as the sensor may sense the unexpected item.

During an exemplary maintenance inspection, the user may command the controller to the maintenance vehicle state which may enable each of the compartment doors fitted with the switchable opacity material 158 to transition to the clear state 258. Here, a quantity of expected towels 524 may be visible to the user through a towel storage clear 548. In one embodiment, a portion of the lavatory door may be fitted with the switchable opacity material 158 enabling a user to view inside the lavatory through a lavatory door clear 538 during, for example, a security situation or threat level.

Figure 6:
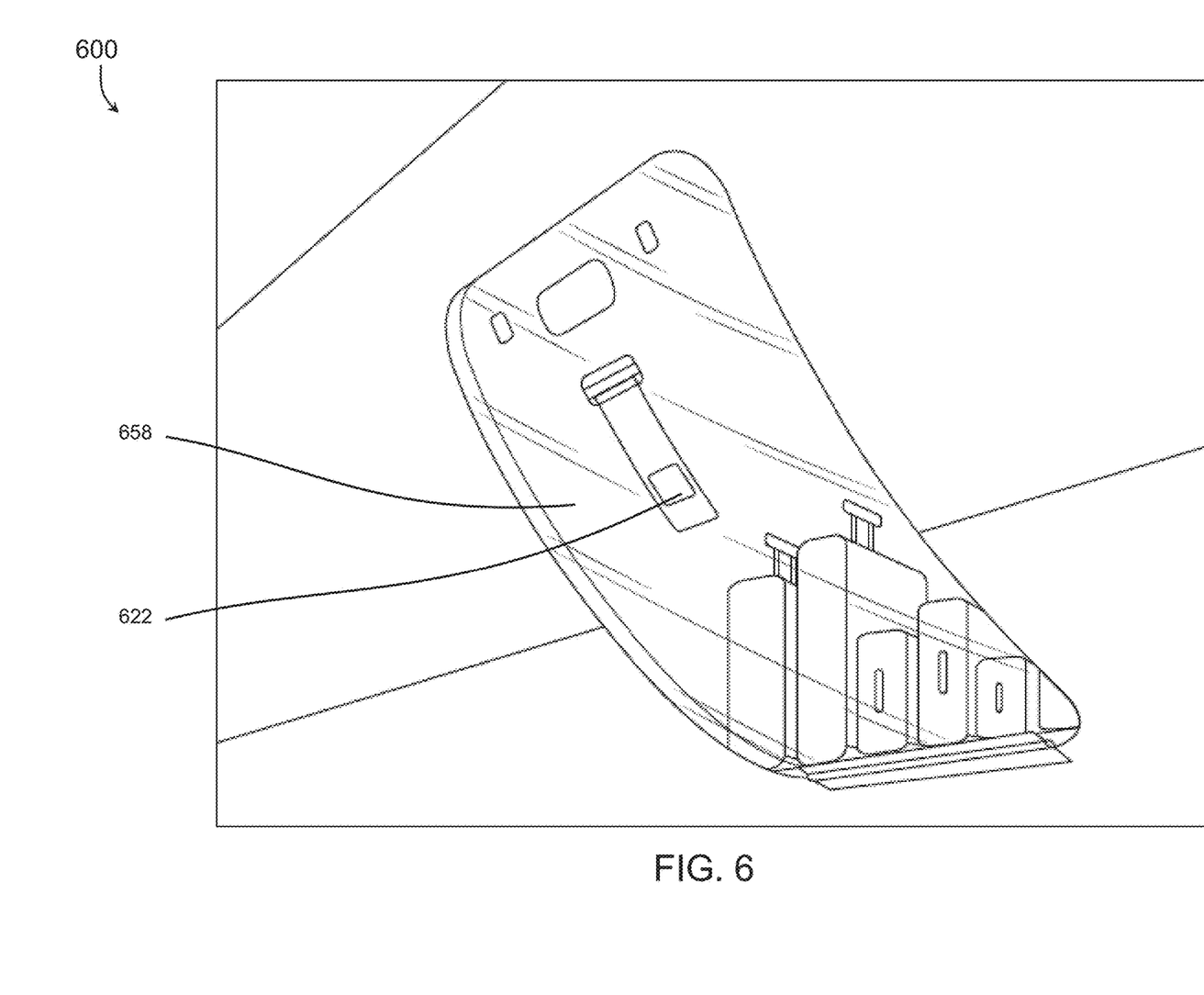
FIG. 6 is a diagram of an exemplary baggage compartment in accordance with one embodiment of the inventive concepts disclosed herein.

FIG. 6

Referring now to FIG. 6, a diagram of an exemplary baggage compartment in accordance with one embodiment of the inventive concepts disclosed herein is shown. An external view 600 may indicate a baggage hold door 622 fitted with the switchable opacity material 158 of sufficient strength to withstand the pressure differential between within the baggage compartment and the ambient pressure. Here, a user performing an external inspection may view the contents of the baggage compartment without opening the baggage compartment door 622 via a baggage hold door clear state 658.

Figure 7:
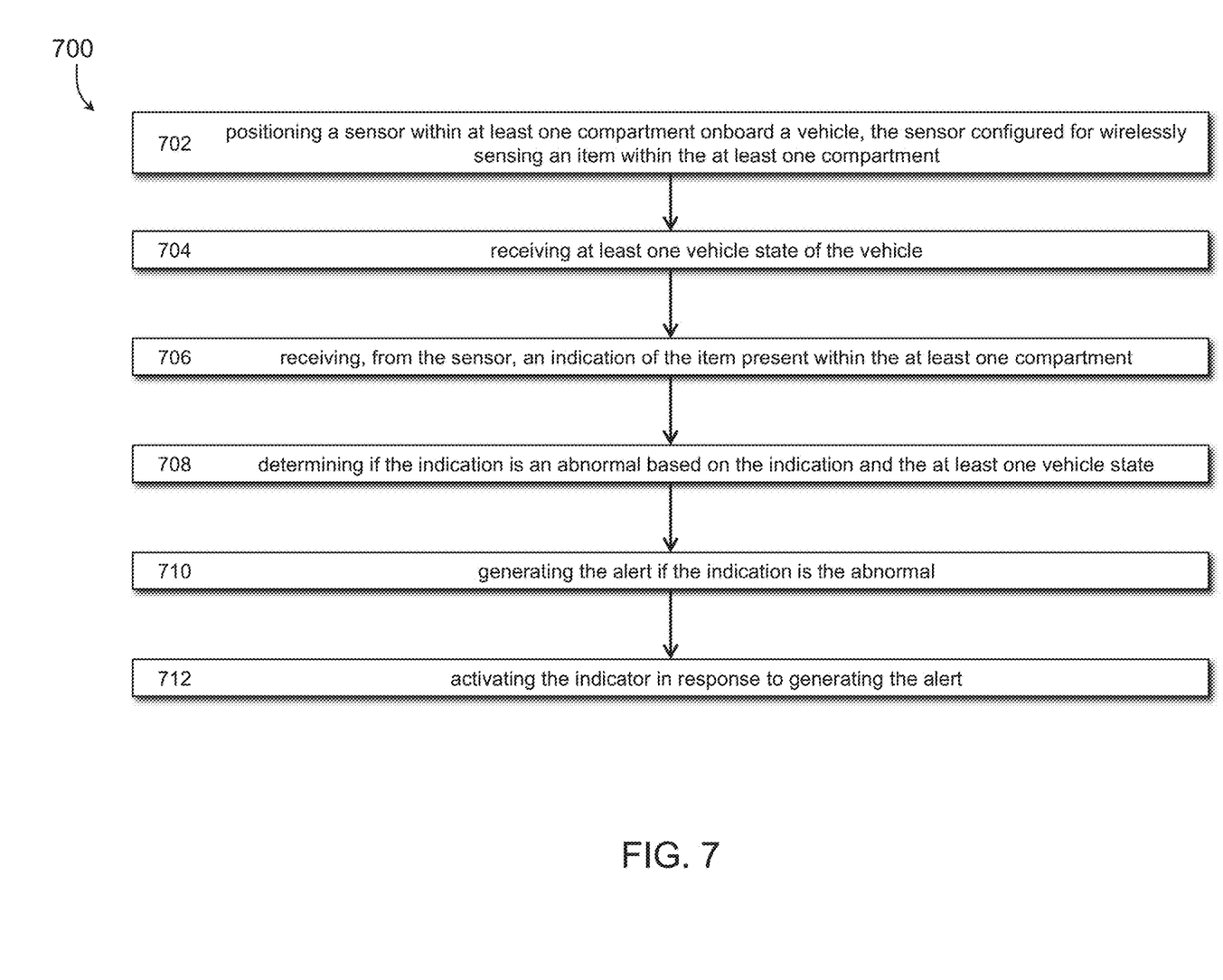
FIG. 7 a diagram of a method flow associated with one embodiment of the inventive concepts disclosed herein.

FIG. 7

Referring now to FIG. 7, a diagram of a method flow associated with one embodiment of the inventive concepts disclosed herein is shown. One exemplary Method Flow 700 may include, at a step 702, positioning a sensor within compartment onboard a vehicle, the sensor configured for wirelessly sensing an item within the compartment and, at a step 704, receiving vehicle state of the vehicle. The method flow 700 may include, at a step 706, receiving, from the sensor, an indication of the item present within the compartment and, at a step 708, determining if the indication is an abnormal based on the indication and the vehicle state. The method may include, at a step 710, generating the alert if the indication is the abnormal and, at a step 712, activating the indicator in response to generating the alert.

Conclusion

As will be appreciated from the above description, embodiments of the inventive concepts disclosed herein may provide a novel solution to determining if an item is within a compartment.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for vehicle compartment item presence indication, comprising:
    at least one compartment onboard a vehicle, the at least one compartment including a compartment door;
    a sensor within the at least one compartment, the sensor configured for wirelessly sensing a presence of an item within the at least one compartment;
    an indicator configured to perform an alert;
    a vehicle system bus configured for transmitting at least one vehicle state of the vehicle;
    a controller operatively coupled with each of the sensor the indicator, and the vehicle system bus;
    a tangible, non-transitory memory configured to communicate with the controller, the tangible, non-transitory memory having instructions stored therein that, in response to execution by the controller, cause the controller to:
    receive the at least one vehicle state of the vehicle from the vehicle system bus;
    receive compartment information including at least one expected feature within the at least one compartment;
    receive, from the sensor, an indication of the item present within the at least one compartment;
    determine if the indication is an abnormal based on the compartment information, the indication and the at least one vehicle state;
    generate the alert if the indication is the abnormal;
    activate the indicator in response to generating the alert; and
    remove power from the sensor and the controller during a specific vehicle state of the at least one vehicle state.

2. The system for vehicle compartment item presence indication of claim 1, wherein at least a portion of the compartment door is constructed of a switchable opacity material configured for one of an opaque state and a clear state, and wherein activate the indicator further comprises commanding the switchable opacity material to the clear state enabling a view within the at least one compartment.

3. The system for vehicle compartment item presence indication of claim 2, further including a compartment illuminator and wherein activate the indicator further includes internally illuminating the at least one compartment.

4. The system for vehicle compartment item presence indication of claim 1, wherein the vehicle further includes one of an aircraft and aerial vehicle, a bus, an auto, a boat, and a train.

5. The system for vehicle compartment item presence indication of claim 1, wherein the at least one compartment further comprises one of an overhead bin, a passenger stowage, a closet, a lavatory compartment, a passenger cabin, a passenger cabin class, a maintenance compartment, a flight deck stowage, and a flight deck compartment.

6. The system for vehicle compartment item presence indication of claim 1, wherein the sensor is one of an infrared (IR) transceiver, a radio frequency (RF) transceiver, and a laser transceiver.

7. The system for vehicle compartment item presence indication of claim 1, wherein the sensor further includes a transmitter paired with a distal receiver, the transmitter paired with a proximal receiver, and a plurality of transceivers positioned for a coverage of the compartment.

8. The system for vehicle compartment item presence indication of claim 1, wherein the indicator further comprises one of a light, a light proximal with the compartment door, a communication to one of a crewmember and a passenger, and a wireless notification.

9. The system for vehicle compartment item presence indication of claim 1, wherein the at least one vehicle state further comprises a taxi, a takeoff, a landing, an altitude, a status of a seat belt sign, a status of a seat belt buckle, a status of a main cabin door, a maintenance inspection, a security inspection, and at least one threat level.

10. The system for vehicle compartment item presence indication of claim 1, wherein the abnormal further comprises, based on a comparison with the at least one vehicle state, at least one of: the item present in an expected empty compartment, an absence of the at least one expected item, a sensed person present in an expected empty portion of the compartment, and the item present in an expected empty portion of the compartment.

11. The system for vehicle compartment item presence indication of claim 1, further comprising a user interface configured for receiving a command from a user and directing the controller to declare a specific one of the at least one vehicle state.

12. A method for vehicle compartment item presence indication, comprising:
- positioning a sensor within at least one compartment onboard a vehicle, the sensor configured for wirelessly sensing an item within the at least one compartment;
- receiving at least one vehicle state of the vehicle;
- receiving, from the sensor, an indication of the item present within the at least one compartment;
- determining if the indication is an abnormal based on the indication and the at least one vehicle state;
- generating an alert if the indication is the abnormal; and
- activating an indicator in response to generating the alert; and
- removing power from the sensor and the controller during a specific vehicle state of the at least one vehicle state.

13. The method for vehicle compartment item presence indication of claim 12, further including receiving compartment information including at least one expected item within the at least one compartment and wherein determining if the indication is the abnormal is further based on the compartment information.

14. The method for vehicle compartment item presence indication of claim 12, wherein the at least one vehicle state further comprises a taxi, a takeoff, a landing, an altitude, a status of a seat belt sign, a status of a seat belt buckle, a status of a main cabin door, a maintenance inspection, a security inspection, and at least one threat level.

* * * * *